(12) United States Patent
Yi

(10) Patent No.: US 11,970,200 B2
(45) Date of Patent: Apr. 30, 2024

(54) STROLLER HANDLE LOCK AUXILIARY STRUCTURE

(71) Applicant: WONDERLAND SWITZERLAND AG, Steinhausen (CH)

(72) Inventor: Xiaolong Yi, Steinhausen (CH)

(73) Assignee: Wonderland Switzerland AG, Steinhausen (CH)

( * ) Notice: Subject to any disclaimer, the term of this patent is extended or adjusted under 35 U.S.C. 154(b) by 212 days.

(21) Appl. No.: 17/387,089

(22) Filed: Jul. 28, 2021

(65) Prior Publication Data
US 2022/0032987 A1 Feb. 3, 2022

(30) Foreign Application Priority Data
Jul. 29, 2020 (CN) .......................... 202010749033.1

(51) Int. Cl.
*B62B 7/08* (2006.01)
*B62B 9/20* (2006.01)

(52) U.S. Cl.
CPC .................. *B62B 7/08* (2013.01); *B62B 9/20* (2013.01); *B62B 2205/20* (2013.01)

(58) Field of Classification Search
CPC .......... B62B 7/08; B62B 9/20; B62B 2205/20
See application file for complete search history.

(56) References Cited

U.S. PATENT DOCUMENTS

| | | | | |
|---|---|---|---|---|
| 5,454,584 A | * | 10/1995 | Haut | B62B 9/26 297/16.2 |
| 6,139,046 A | * | 10/2000 | Aalund | B62B 9/20 280/47.38 |
| 2014/0183843 A1 | * | 7/2014 | Iftinca | B62B 9/245 280/647 |
| 2015/0048599 A1 | * | 2/2015 | Liu | B62B 7/142 280/642 |
| 2020/0172142 A1 | * | 6/2020 | Young | B62B 7/142 |

* cited by examiner

*Primary Examiner* — Bryan A Evans
(74) *Attorney, Agent, or Firm* — Cermak Nakajima & McGowan LLP; Shelly Guest Cermak

(57) ABSTRACT

The present invention discloses a stroller handle lock auxiliary structure disposed in a stroller frame of a stroller. The stroller frame includes a lower frame and a stroller handle pivotally connected on the lower frame. The lower frame includes a first linking rod. The first linking rod is provided with a fitting portion protruding toward an outer side of the lower frame, and the stroller handle is provided with a reversing sliding sleeve matching with the fitting portion. The stroller handle lock auxiliary structure includes a rib that pushes the first linking rod toward the outer side of the lower frame. Compared to the prior art, the stroller handle lock auxiliary structure of the present invention is provided with the rib that pushes the first linking rod outward, and so when the stroller carries a weight, the first linking rod of the stroller frame is prevented from shifting excessively inward, allowing the reversing sliding sleeve to be smoothly fitted with the fitting portion, thereby facilitating locking of the position of the stroller handle and ensuring stability and safety. The present invention further discloses a stroller handle lock auxiliary structure.

15 Claims, 13 Drawing Sheets

STROLLER HANDLE LOCK AUXILIARY STRUCTURE

This application claims priority under 35 U.S.C. § 119 to Chinese patent application no. 202010749033.1, filed Jul. 29, 2020, the entirety of which is incorporated by reference herein.

BACKGROUND OF THE INVENTION

Field of the Invention

The present invention relates to a technical field of strollers, and more particularly to an auxiliary structure for locking a stroller handle.

Description of the Prior Art

A stroller frame of a stroller shown in FIG. 1 includes two front legs 91, two rear legs 93, two side handrails 93, and two seat pipes 94. On the same side, the front leg 91 is pivotally connected to the upper end of the rear leg 92, the front end of the side handrail 93 is pivotally connected to the upper ends of the front leg 91 and the rear leg 92, the rear end of the side handrail 93 is connected to a first linking rod 95, the first linking rod 95 is connected to a second connecting rod 96, and the lower end of the second linking rod 96 is pivotally connected on the rear leg 92. When the stroller frame is folded, the front leg 91 and the rear leg 92 are mutually gathered, and the first linking rod 95 and the second linking rod 96 achieve automatic folding of the side handrail 93. The two seat pipes 94 are for disposing a seat that carries an infant. The front end of each seat pipe 94 is pivotally connected to the front leg 91, and the rear end is pivotally connected to the first linking rod 95. With respect to the first linking rod 95, the seat pipe 94 connected thereto is on the inner side thereof, and the second linking rod 96 connected thereto is on the outer side thereof.

The stroller frame further includes a stroller handle 97, by which a parent can push the stroller. The stroller handle 97 is installed in an adjustable manner in the stroller frame. More specifically, the stroller handle 97 includes two side rails 971, and the lower end of each side rails 971 is pivotally connected to the second linking rod 96 so that the stroller handle 97 can be in a forward position of use as shown in FIG. 1 or be swayed forward to a backward position of use. In the forward position of use, the stroller moves toward the side of the front legs 91; in the backward position of use, the stroller moves toward the side of the rear legs 92.

Referring to both FIG. 1 and FIG. 2, a reversing sliding sleeve 98 is slidably disposed on the side rail 971, and at the same time an elastic member is provided in the side rail 971 to provide the reversing sliding sleeve 98 with an elastic force that pushes downward. The reversing sliding sleeve 98 has two pushing surfaces 981 and a fitting slot 982 between the two pushing surfaces 981. A protruding fitting portion 951 is provided on the outer side of the first linking rod 95. When the stroller handle 97 is swayed from the backward position of use to the forward position of use, the pushing surface 981 first comes into contact with the fitting portion 951 and drives the reversing sliding sleeve 98 to slide upward, as shown in FIG. 3. Once the pushing surface 981 and the fitting portion 951 are staggered, the elastic member pushes the reversing sliding sleeve 98 to move downward, and the fitting portion 951 becomes fitted in the fitting slot 982. A similar fitting portion may also be disposed at the front end of the side handrail 93 or the upper end of the front leg 91 to move the stroller handle 97 to the backward position of use. Moreover, a limiting sleeve 99 located below the reversing sliding sleeve 98 is further fixed on the side rail 971, and a stop block 991 projecting toward the inner side of the stroller frame is disposed on the limiting sleeve 99. The limiting sleeve 99 limits the position of the reversing sliding sleeve 98, and at the same time the stop block 991 is pressed below the fitting portion 951 to prevent the side rail 971 in overall from shifting upward.

As shown in FIG. 4, in an ideal state, the reversing sliding sleeve 98 is in intact fitted on the fitting portion 951 and achieves locking of the position of the stroller handle 97, ensuring the stability and safety while the stroller is being pushed. However, in an actual application process, the stroller carries an infant, and the weight of the infant may cause the structures on the two sides of the stroller frame to slightly move toward the middle. Once the first linking rod 95 is shifted toward the middle, the position of the fitting portion 951 does not exactly correspond to the position of the reversing sliding sleeve 98, in a way that the reversing sliding sleeve 98 may not be properly fitted on the fitting portion 951. At this point, the position of the stroller handle 97 cannot be locked, giving rise to safety concerns.

Therefore, to resolve the foregoing issues, there is a need for an auxiliary structure for locking the position of a stroller handle for a stroller frame.

SUMMARY OF THE INVENTION

It is an object of the present invention to provide an auxiliary structure facilitating locking the position of a stroller handle.

It is another object of the present invention to provide an auxiliary structure facilitating locking the position of a stroller handle.

To achieve the objects above, the present invention provides a stroller handle lock auxiliary structure disposed in a stroller frame of a stroller. The stroller frame includes a lower frame and a stroller handle pivotally connected on the lower frame. The lower frame includes a first linking rod. The first linking rod is provided with a fitting portion protruding toward an outer side of the lower frame, and the stroller handle is provided with a reversing sliding sleeve for matching with the fitting portion. The stroller handle lock auxiliary structure includes a rib that pushes the first linking rod toward the outer side of the lower frame.

Compared to the prior art, the stroller handle lock auxiliary structure of the present invention includes the rib that pushes the first linking rod outward. Thus, when the stroller carries a weight, the first linking rod of the stroller frame is prevented from shifting excessively inward, allowing the reversing sliding sleeve to be smoothly fitted with the fitting portion, thereby facilitating locking of the position of the stroller handle and ensuring stability and safety.

Preferably, the first linking rod is provided with a guide groove, and the rib pushes the first linking rod outward when the rib is fixed with the stroller handle and fitted in the guide groove.

Specifically, a sidewall of an outer side of the guide groove is connected to a guide surface, and the rib slides into the guide groove through the guide surface when staggered from an opening of the guide groove.

More specifically, a limiting sleeve located below the reversing sliding sleeve is fixed on the stroller handle. The limiting sleeve has a stop block projecting toward an inner side of the stroller frame, and the rib is fixed on the stop block.

Specifically, the first linking rod is provided with a protruding portion protruding outward, one side of the protruding portion forms the fitting portion, and the other side of the protruding portion is provided with the guide groove.

Preferably, the rib is inserted into the lower frame and pushes the inner side of the first linking rod.

Preferably, a fast-plug cover inserted into the lower frame and located on the inner side of the first linking rod is further included. The rib is protrudingly disposed on one surface of the fast-plug cover facing outward.

Specifically, the rib is a strip-like structure.

Specifically, the rib has a height of 3 mm.

Specifically, the lower frame includes a front leg and a seat pipe connected between the front leg and the first linking rod, and the fast-plug cover is inserted between the seat pipe and the first linking rod.

More specifically, the fast-plug cover is fixed on the seat pipe and rotates along with the seat pipe.

Further, an end of the seat pipe is provided with a docking portion, and an edge of the fast-plug cover includes a fixing flange for fitting at the docking portion.

More specifically, an end of the docking portion is provided with a positioning lip, and the fast-plug cover includes a pushing portion pushing the inner side of the positioning lip.

More specifically, the docking portion is provided with an annular portion, and the fast-plug cover has a notch that exposes the annular portion.

A stroller handle lock auxiliary structure is provided in a stroller frame of a stroller. The stroller frame includes a lower frame and a stroller handle pivotally connected on the lower frame. The lower frame includes a first linking rod. The first linking rod is provided with a fitting portion protruding toward an outer side of the lower frame, and the stroller handle is provided with a reversing sliding sleeve for matching with the fitting portion. The stroller handle lock auxiliary structure includes a fast-plug cover inserted into the lower frame and located on an inner side of the first linking rod. One surface of the fast-plug cover facing outward is protrudingly provided with a rib, and the rib pushes the first linking rod toward the outer side of the lower frame.

DETAILED DESCRIPTION OF THE EMBODIMENTS

The preferred embodiments of the present invention are given with the accompanying drawings in the description below.

Figure 1:
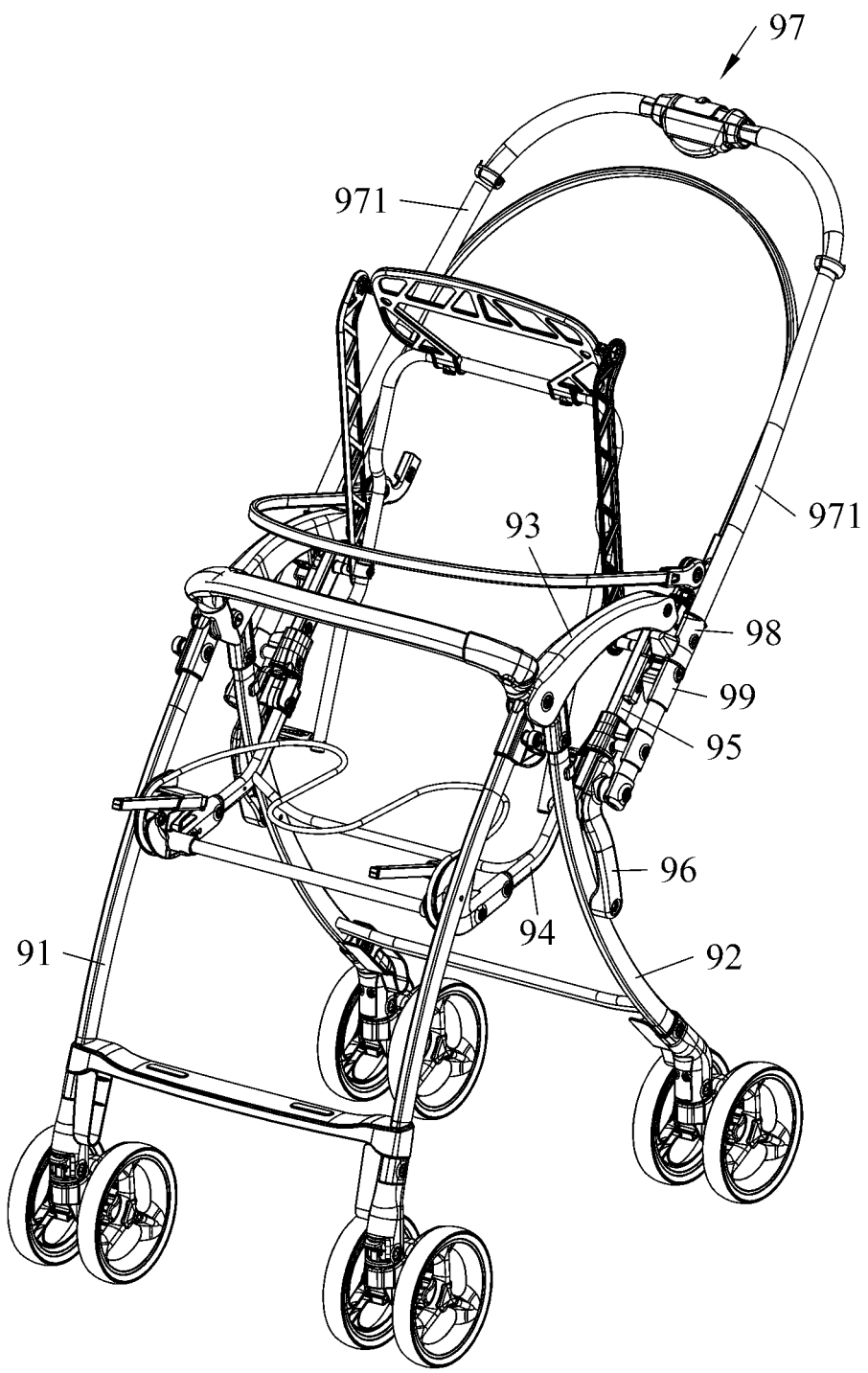
FIG. 1 is a three-dimensional diagram of a stroller frame of the prior art.
Figure 2:
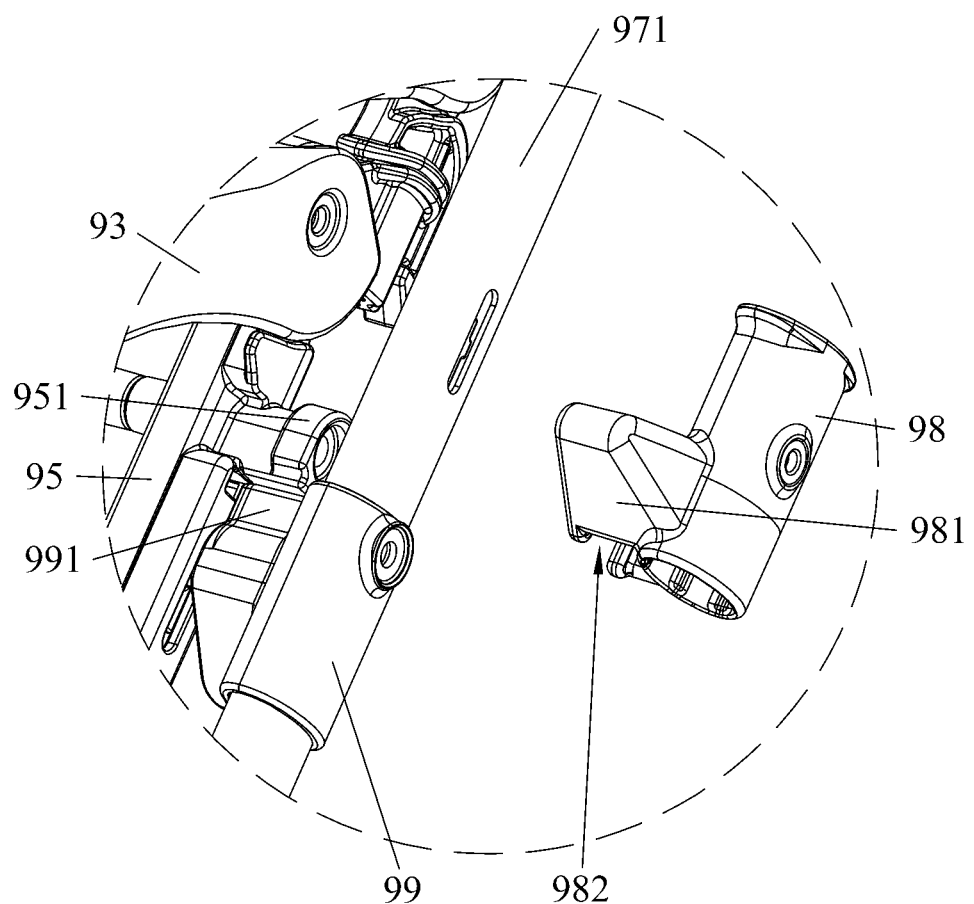
FIG. 2 is an enlarged view of positions of a reversing sliding sleeve provided in the stroller handle and a fitting portion in FIG. 1.
Figure 3:
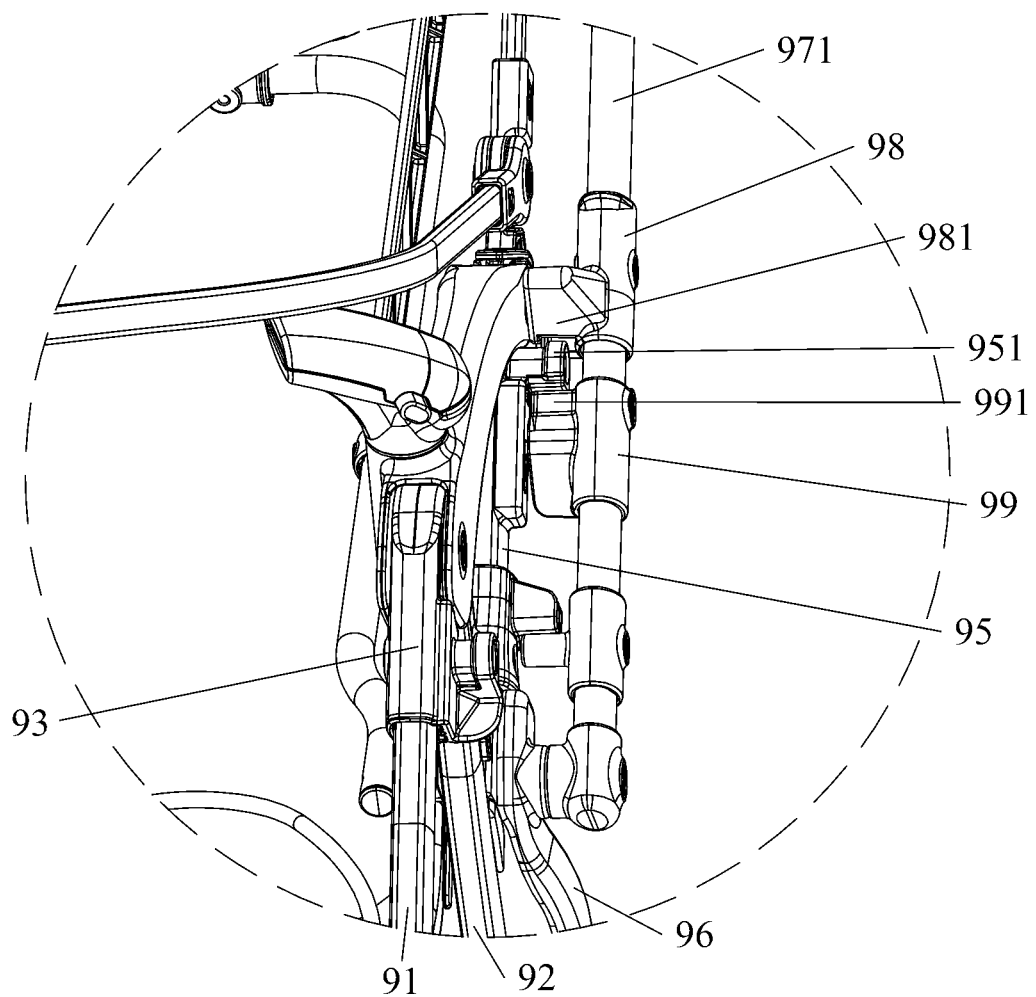
FIG. 3 is a schematic diagram when a reversing sliding sleeve is fitted on a fitting portion.
Figure 4:
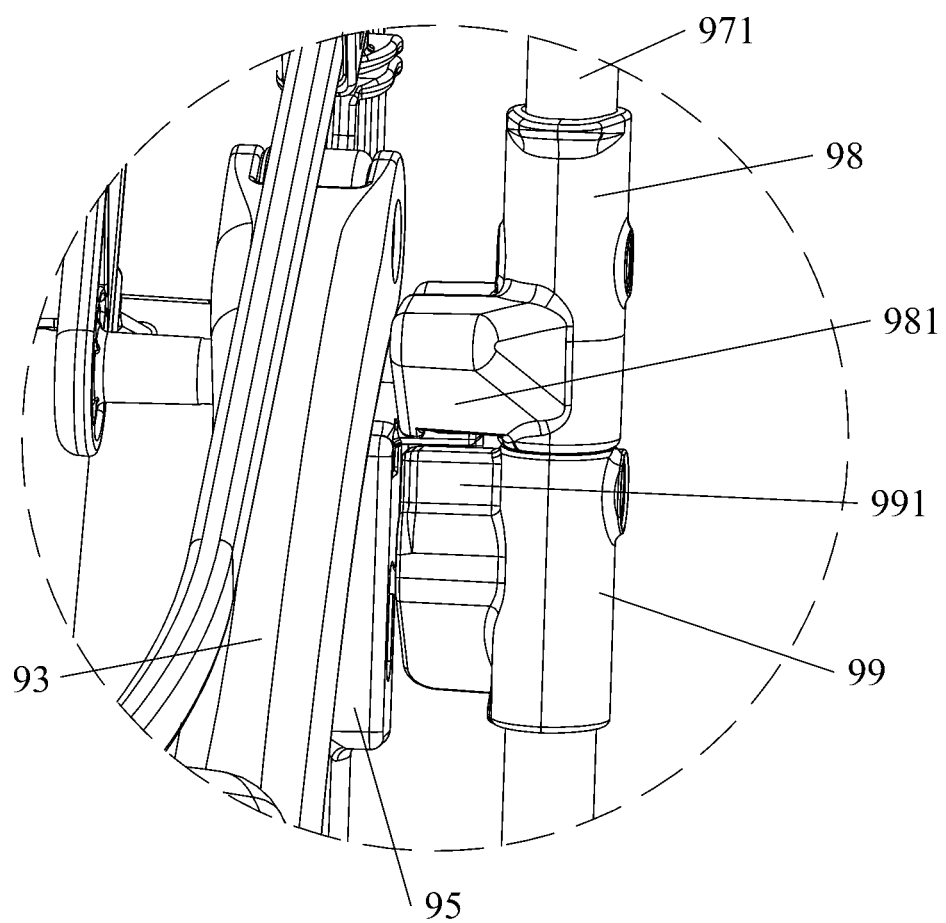
FIG. 4 is a schematic diagram when a reversing sliding sleeve is fitted at the fitting portion.
Figure 5:
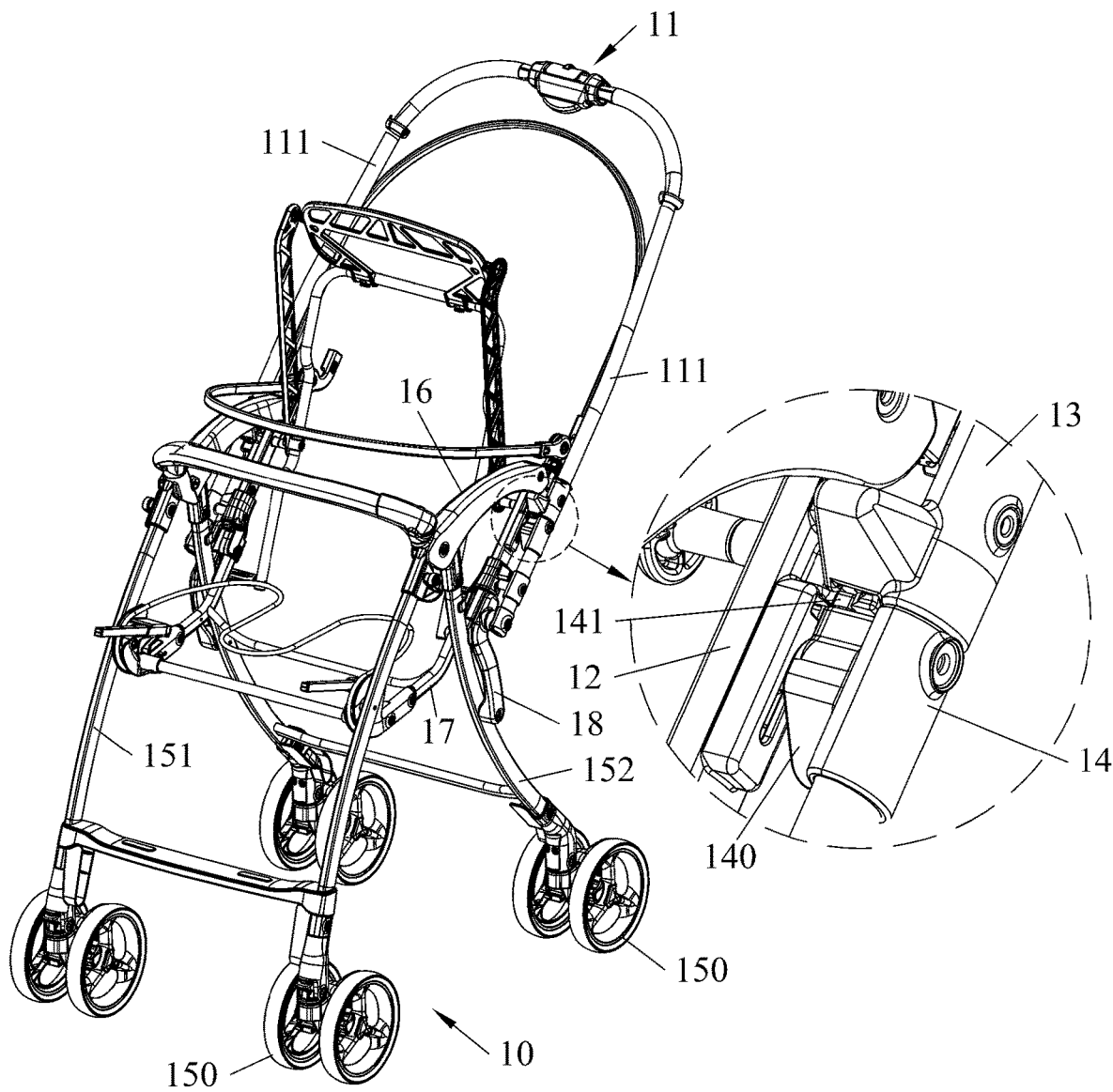
FIG. 5 is a three-dimensional diagram of a stroller frame according to a first embodiment of the present invention.
Figure 6:
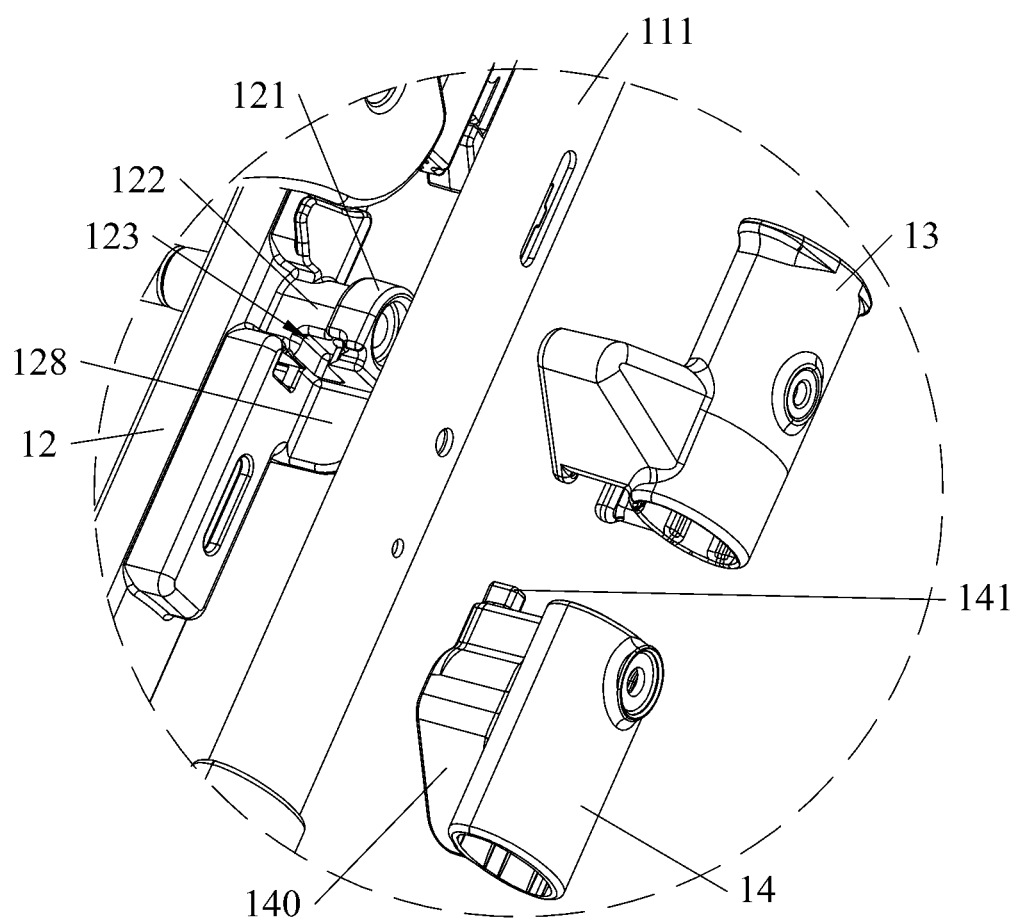
FIG. 6 is an enlarged diagram of a reversing sliding sleeve and a limiting sleeve disengaged from a stroller handle according to the first embodiment of the present invention.
Figure 7:
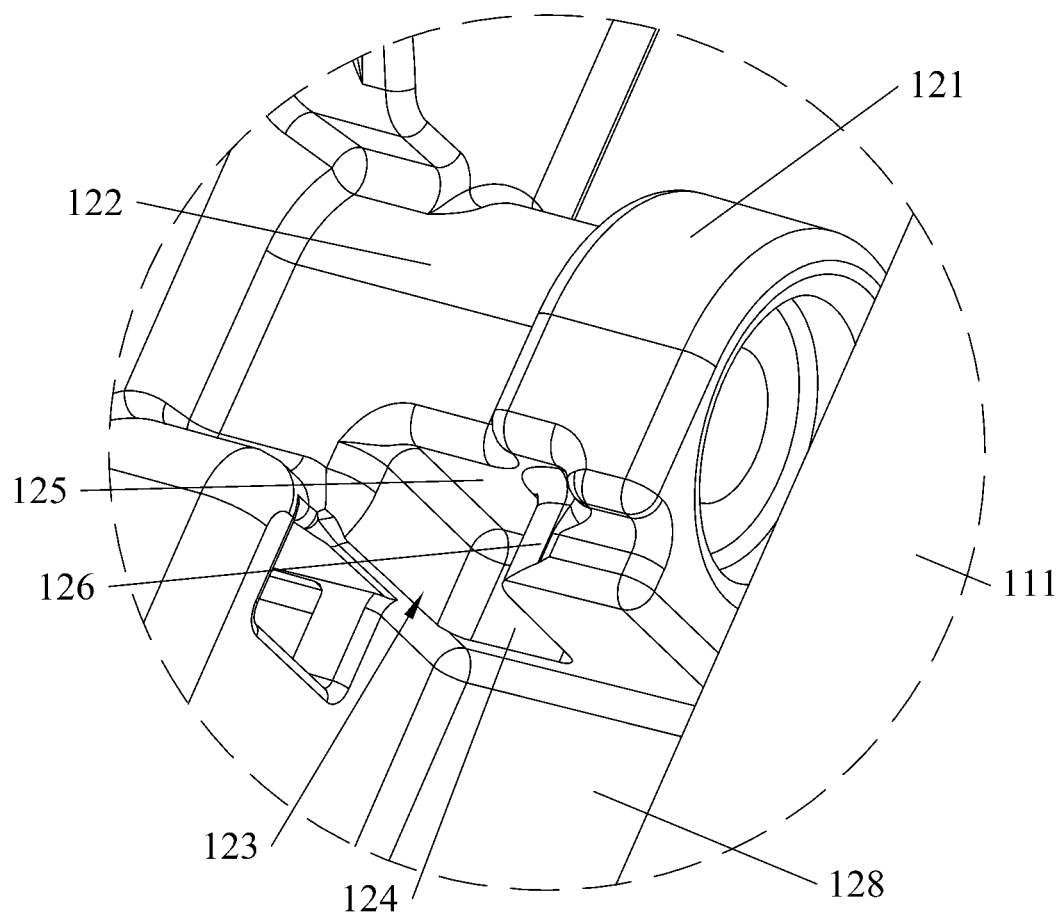
FIG. 7 is an enlarged diagram of a fitting portion and a guide groove.

Referring to FIG. 5 to FIG. 7, the present invention provides a stroller handle lock auxiliary structure provided in a stroller frame 1 of a stroller. The stroller frame 1 includes a lower frame 10 and a stroller handle 11 pivotally connected to the lower frame 10. The stroller handle 11 is U-shaped and includes side rails 111 respectively located on two sides of the lower frame 10. The stroller handle 11 may be in a forward position of use relative to the lower frame 10 as shown in in FIG. 5, or may be swayed forward to a backward position of use relative to the lower frame 10. The lower frame 10 includes a first linking rod 12. The first linking rod 12 is provided with a fitting portion 121 protruding toward the outer side of the lower frame 10, the side rail 111 of the stroller handle 11 is slidably disposed with a reversing sliding sleeve 13 matching with the fitting portion 121, and the reversing sliding sleeve 13 achieves locking of the position of the stroller handle 11 by fitting with the fitting portion 121. The first linking rod 12 is two in quantity, and the two linking rods 12 are respectively located on the two sides of the lower frame 10, and both of the side rails 111 of the stroller handle 11 are provided with the reversing sliding sleeves 13. In practice, the two sides of the stroller frame 1 are in a symmetrical structure, and so only one of the sides is described in detail. The stroller handle lock auxiliary structure of the present invention includes a rib 141 that pushes the first linking rod 12 toward the outer side of the lower frame 10. The rib 141 pushes the first linking rod 12 outward, so that the inward shift of the first linking rod 12 can be reduced when the stroller frame 1 carries a weight.

The lower frame 10 includes two front legs 151, two rear legs 152, two side handrails 16 and two seat pipes 17. For the same side of the lower frame 10, an upper end of the front leg 151 is pivotally connected to an upper end of the rear leg 152, lower ends of the front leg 151 and the rear leg 152 are disposed with a wheel 150, a front end of the side handrail 16 is pivotally connected on the front leg 151 and the rear leg 152, a rear end of the side handrail 16 is pivotally connected to one end of the first linking rod 12, the other end of the first linking rod 12 is connected to a second linking rod 18, and the other end of the second linking rod 18 is pivotally connected on the rear leg 152. A lower end of the side rail 111 of the stroller handle 11 is pivotally connected on the second linking rod 18 so as to be able to sway relative to the lower frame 10. A front end of the seat pipe 17 is pivotally connected on the front leg 151, and a rear end of the seat pipe 17 is connected to the first linking rod 12.

The first linking rod 12 is provided with a protruding portion 122 protruding outward, the fitting portion 121 is fixed at an end of the protruding portion 122 and protrudes upward relative to the protruding portion 122, and a top portion of the fitting portion 121 is shaped as an arched surface. The fitting process of the reversing sliding sleeve 13 and the fitting portion 121 is prior art and is described in the background of the invention, and is therefore not repeated herein. The protruding portion 122 is further provided with a guide groove 123. The guide groove 123 is located on one side away from the fitting portion 121, and an opening exists on each of both sides of the guide groove 123. A first bottom surface 124 of the guide groove 123 inclines upward, and a second bottom surface 125 connected to the first bottom surface 124 inclines downward. A sidewall on an outer side of the guide groove 123 is connected with a guide surface 126 that faces upward. In this embodiment, the guide surface 126 is an arched surface, and may also be a sloped surface.

The side rail 111 is further fixed with a limiting sleeve 14 located below the reversing sliding sleeve 13. The limiting sleeve 14 includes a stop block 140 projecting toward an inner side of the stroller frame 1. When the stroller handle 11 is in the forward position of use as shown in FIG. 5, the stop block 140 is abutted diagonally below the protruding portion 122. The rib 141 is disposed on an upper end of the stop block 140 and protrudes relative to the stop block 14. The rib 141 may be a rectangular structure, or may be a column structure.

When the stroller carries a weight, the structures on the two sides of the stroller frame 1 shift toward the middle. At this point, the position of the fitting portion 121 on the first linking rod 12 is slightly staggered from the reversing sliding sleeve 13, and two are incapable of being properly fitted; moreover, the position of the guide groove 123 is also more inward relative to the position of the rib 141. In order to properly lock the position of the stroller handle 11, the stroller handle 11 may be forcibly pressed downward, the side rail 111 then drives the rib 141 downward to come into contact with the guide surface 126, and the rib 141 is slid into the guide groove 123 under the guiding of the guide surface 126. Meanwhile, the force of the rib 141 relative to the sidewall of the guide groove 123 also pushes the first linking rod 12 to move outward, so that the position offset between the fitting potion 121 and the reversing sliding sleeve 13 is corrected, thereby facilitating proper fitting of the reversing sliding sleeve 13 and stabilizing the position and enhancing safety of the stroller handle 11. The width of the guide groove 123 is slightly larger than that of the rib 141. When the rib 141 is located in the guide groove 123, the rib 141 provides the first linking rod 12 with a limiting effect, such that an offset of the first linking rod 12 in the widthwise direction of the stroller frame 1 is unlikely produced.

In other embodiments, the guide groove 123 may also be disposed on other positions of the first linking rod 12, for example, at a lower end; however, disposing the guide groove 123 on a position close to the fitting portion 121 is one option that yields a better result.

Preferably, a baffle 128 is further connected between the first linking rod 12 and the protruding portion 122. When the stroller handle 11 is swayed from the backward position of use to the forward position of use, the baffle 128 coordinates with the stop block 140 so as to limit the stroller handle 11.

Figure 8:
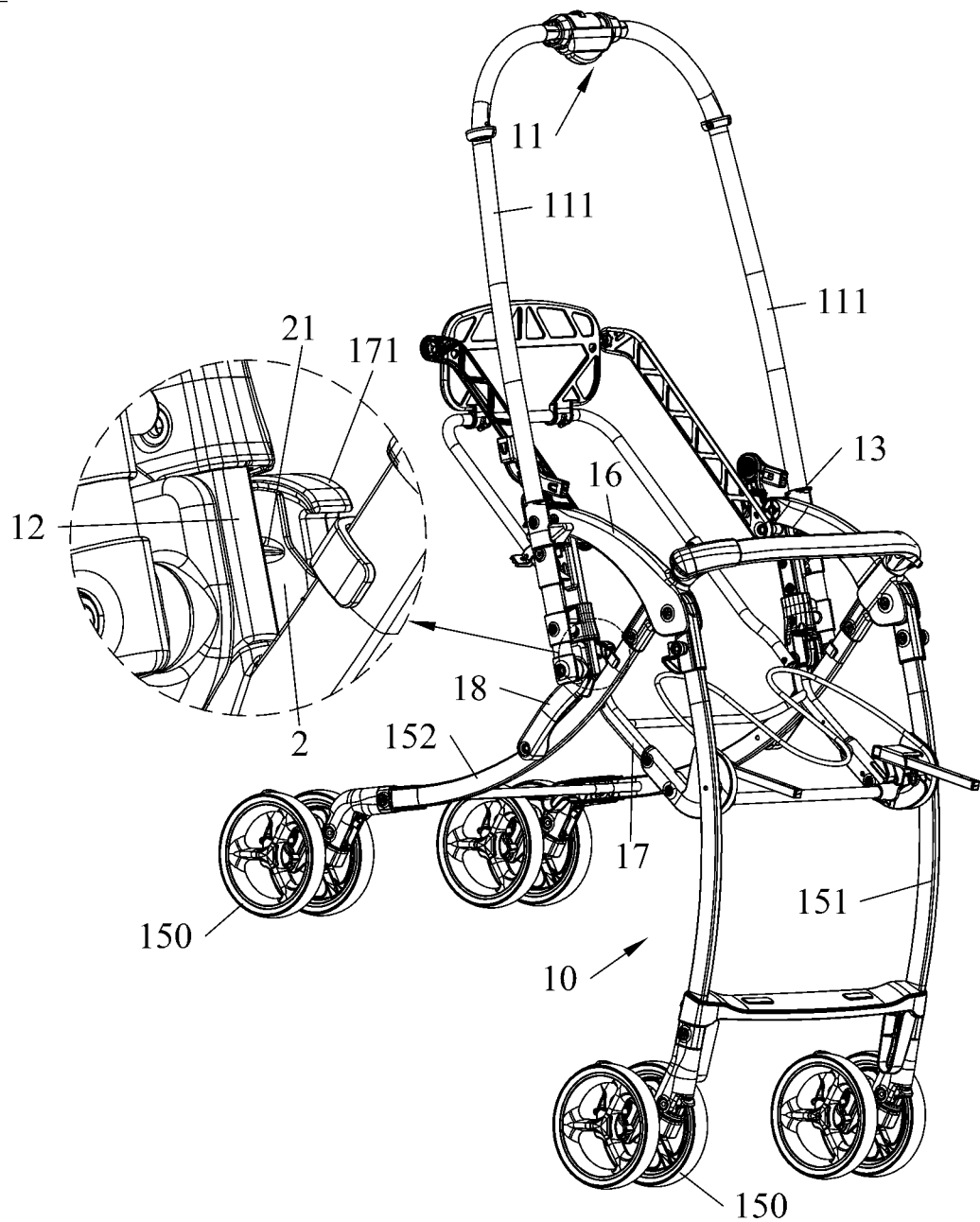
FIG. 8 is a three-dimensional diagram of a stroller frame according to a second embodiment of the present invention.
Figure 9:
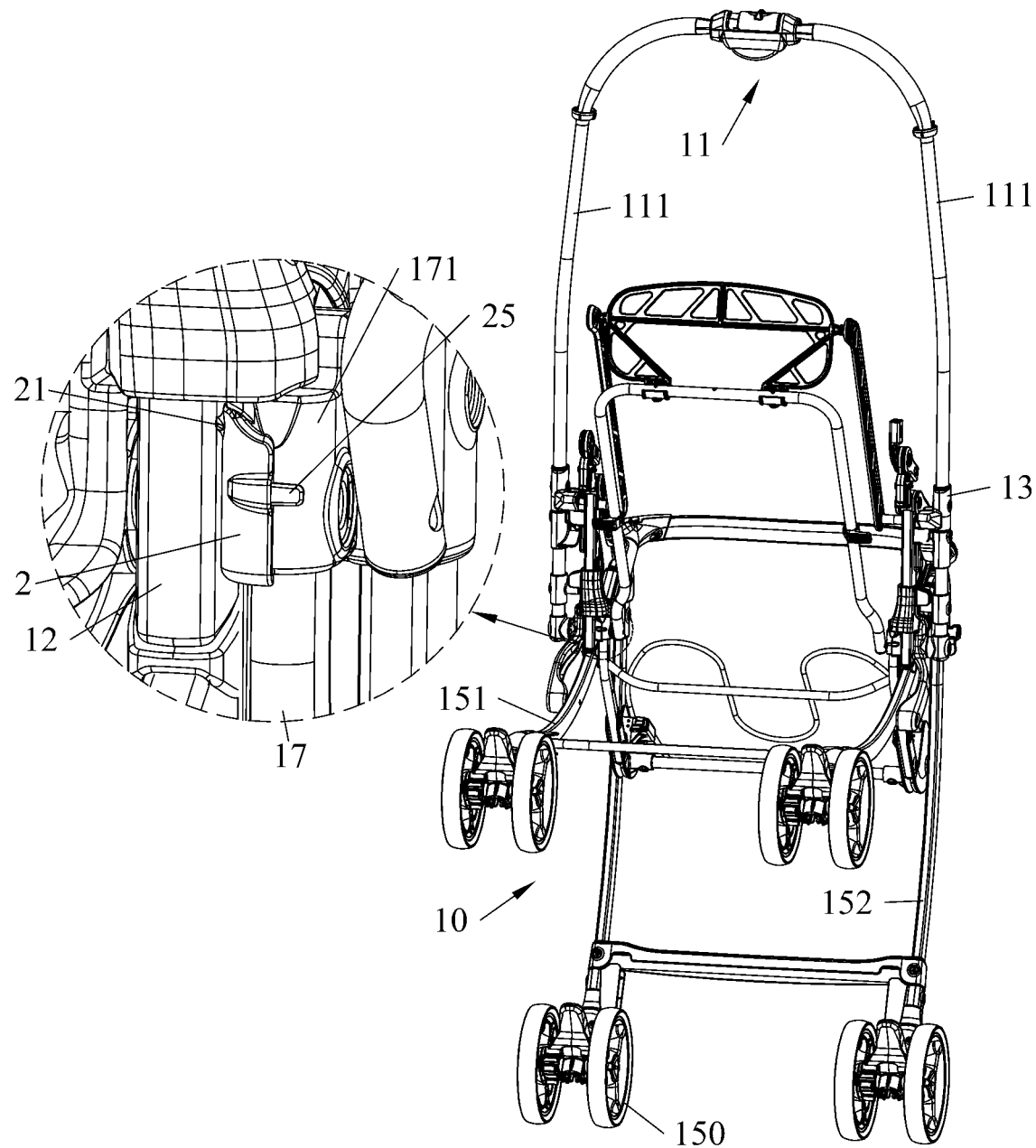
FIG. 9 is a three-dimensional diagram of a stroller frame from another angle according to the second embodiment of the present invention.
Figure 10:
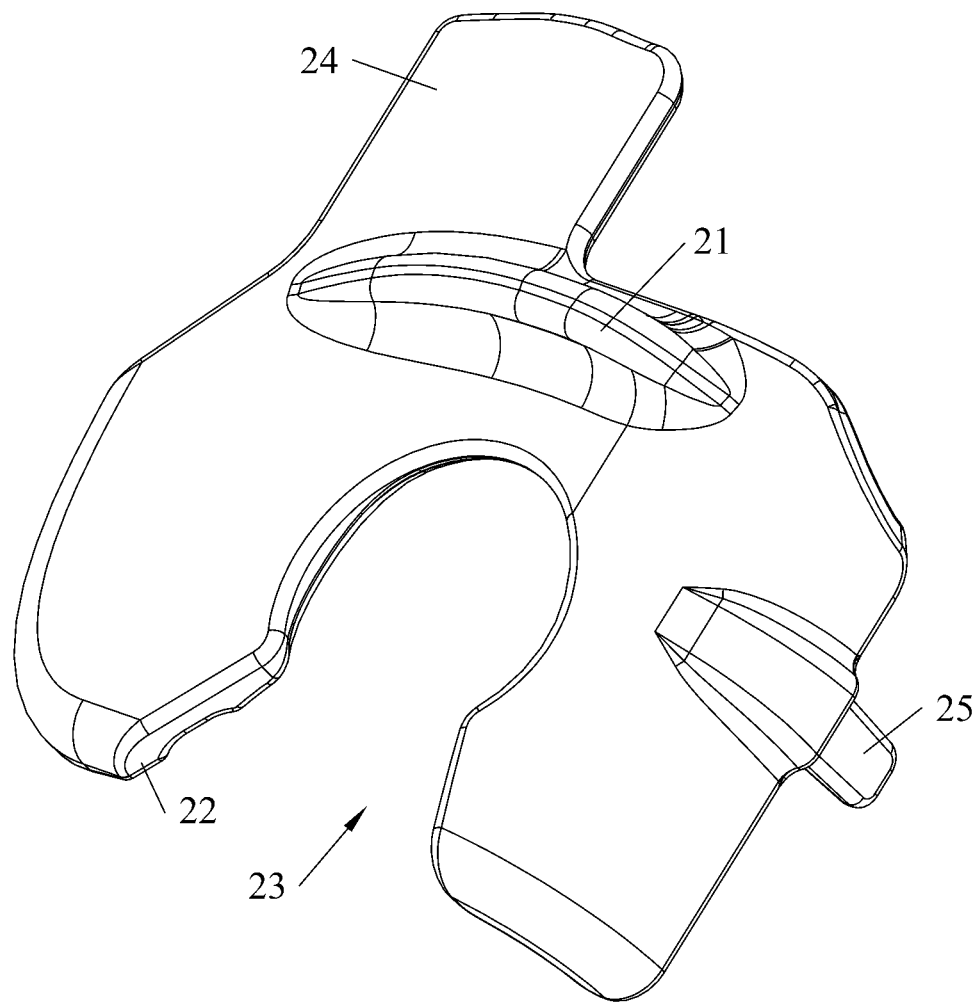
FIG. 10 is a three-dimensional diagram of a rib shown from a fast-plug cover according to the second embodiment of the present invention.

As shown in FIG. 8 to FIG. 10, in a second embodiment of the present invention, the rib 21 is no longer fixed on the side rail 111 of the stroller handle 11, but is disposed in the lower frame 10. The rib 21 disposed in the lower frame 10 is similarly capable of pushing the first linking rod 12 outward.

Figure 11:
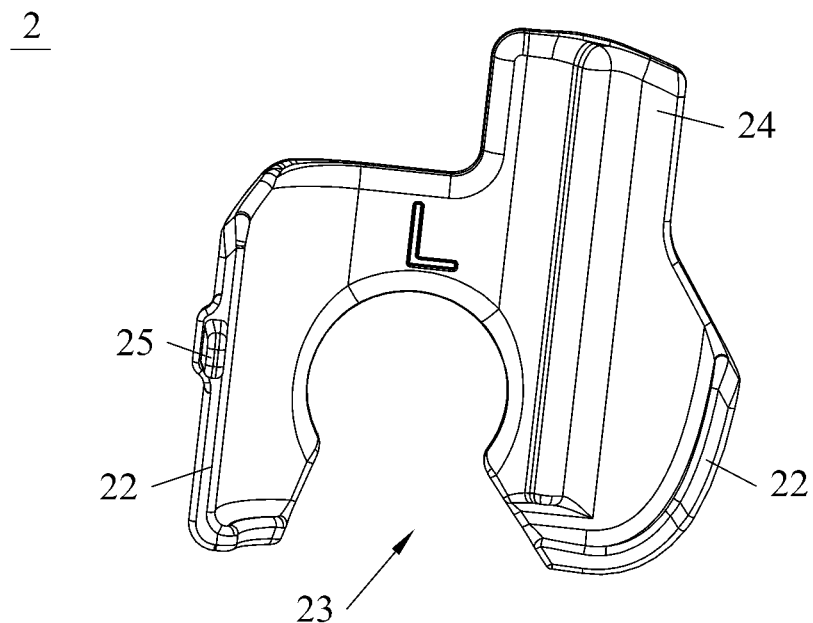
FIG. 11 is a three-dimensional diagram of another surface of a fast-plug cover.
Figure 12:
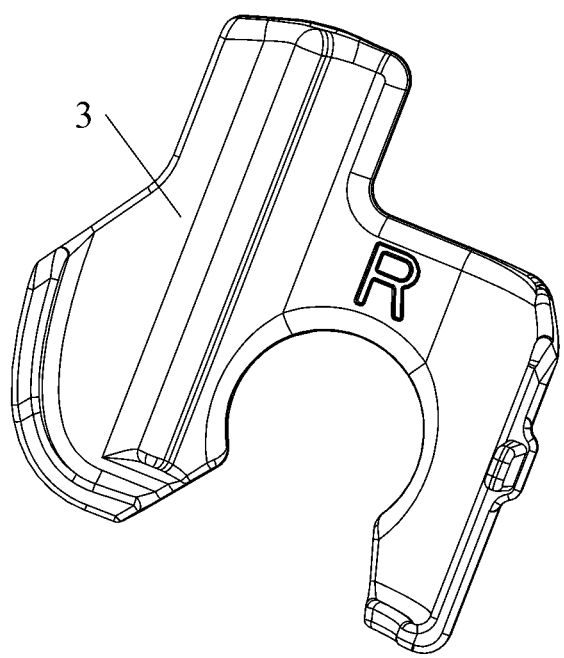
FIG. 12 is a three-dimensional diagram of another fast-plug cover on the other side.

Specifically, the stroller frame 1 of this embodiment further includes a fast-plug cover 2 inserted into the lower frame 10. The fast-plug cover 2 is located on an inner side of the first linking rod 12 when inserted, and the rib 21 is protrudingly disposed on one surface of the fast-plug cover 2 facing outward. In combination with FIG. 11, an edge of the other surface of the fast-plug cover 2 is provided with a fixing flange 22 for fixing the fast-plug cover 2. The fast-plug cover 2 include a notch 23 separating the fixing flange 22 into two sections, and a pushing portion 24 located on one side away from the notch 23. The fast-plug cover 2 of this embodiment is a curved structure that is slightly arched, and has a fitting arm 25 extended from one side thereof. It is known that the stroller frame 1 is a symmetrical structure, and the first linking rod 12 is disposed on each of both sides of the stroller frame 1. Thus, fast-plug covers 2 and 3 are respectively inserted on the two sides of the stroller frame 1 so as to respectively push the two first linking rods 12. The two fast-plug cover 2 may also be mutually symmetrical, with the other fast-plug cover 3 as shown in FIG. 12. The two fast-plug covers 2 and 3 may be differentiated by means of alphabet, text or graphic.

Again referring to FIG. 8 and FIG. 9, in this embodiment, the fast-plug cover 2 is inserted between the first linking rod 12 and the seat pipe 17 located on the inner side of the first linking rod 12, and the inserted fast-plug cover 2 is fixed on the seat pipe 17 and the rib 21 pushes outward on the first linking rod 12.

Figure 13:
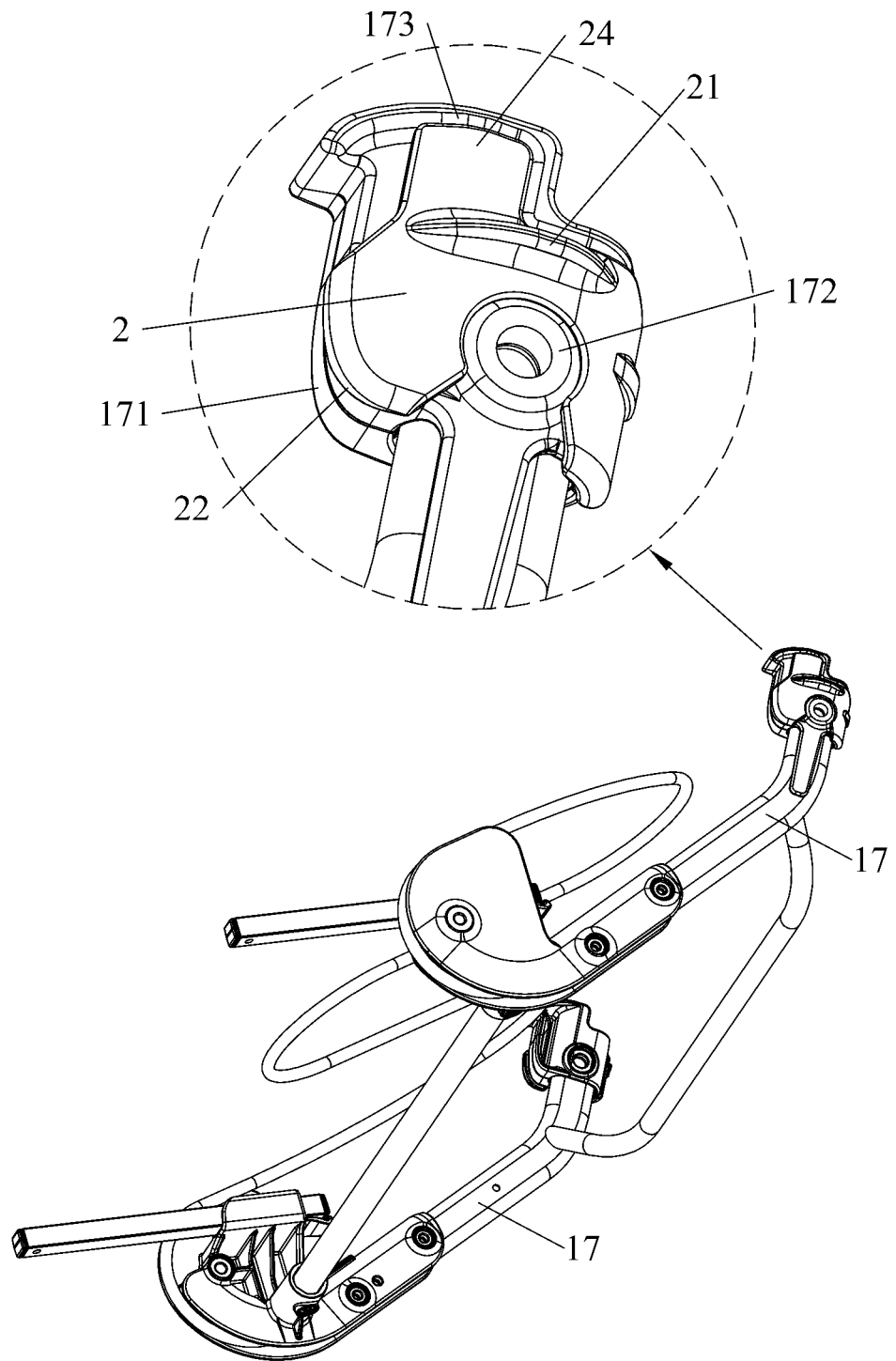
FIG. 13 is a three-dimensional diagram of a fast-plug cover fixed on an end of a seat pipe.

Referring to FIG. 13, one end of the seat pipe 17 connected to the first linking rod 12 is provided with a docking portion 171. The docking portion 171 is provided with an annular portion 172 for a pivotal axis to pass through, and an edge of the docking portion 171 is provided with a positioning lip 173. When the fast-plug cover 2 is inserted between the first linking rod 12 and the seat pipe 17, the fixing flange 22 thereon envelops the docking portion 171, the fitting arm 25 is fitted on the docking portion 171, the pushing portion of the fast-plug cover 2 at the same time pushes an inner side of the positioning lip 173, and the annular portion 172 is exactly accommodated in the notch 23 provided on the fast-plug cover 2. The fast-plug cover 2 is capable of rotating along with the seat pipe 17 when fixed on the docking portion 171, thereby maintaining pushing against the first linking rod 12 at all times.

Specifically, as shown in FIG. 10, the rib 21 of this embodiment appears as a strip-like structure, and an extension direction thereof substantially coincides with the widthwise direction of the first linking rod 12, so as to comprehensively push the first linking rod 12 when inserted. Preferably, the middle part of the rib 21 is higher than two ends thereof, and the height of the middle part is approximately 3 mm.

Figure 14:
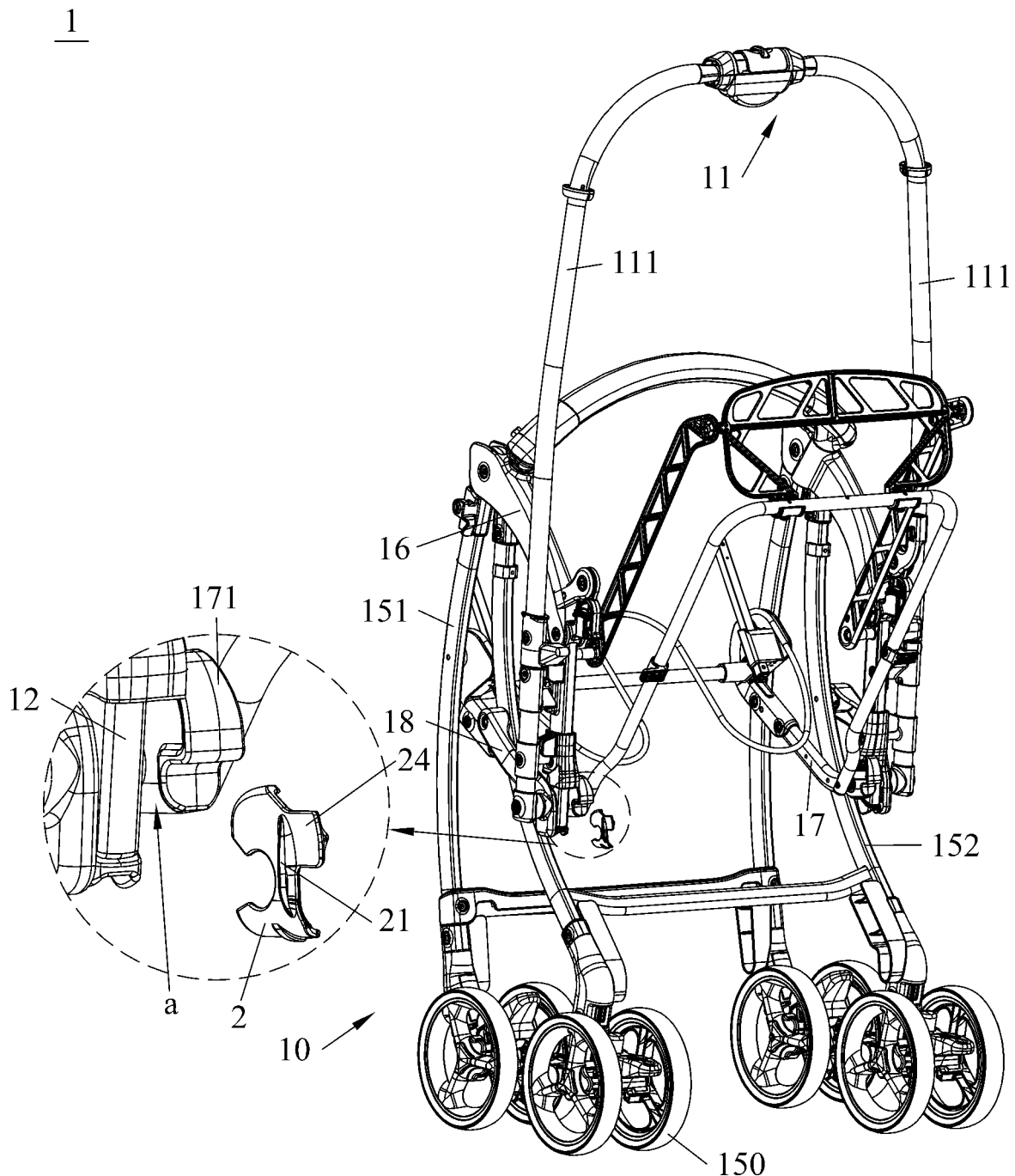
FIG. 14 is a schematic diagram of a stroller frame in a folded state.

Referring to FIG. 14, when the stroller frame 1 is in a folded state, a joint position of the docking portion 171 of the seat pipe 17 and the first linking rod 12 exposes a gap a, and this provides ease for operation. In this state, the fast-plug cover 2 is inserted into the gap a, and the stroller frame 1 is then unfolded to allow the rib 21 to keep pushing the first linking rod 12.

In other embodiments, when the lower frame 10 is in another structure, the fast-plug cover 2 may also be inserted between the first linking rod 12 and another position. In this embodiment, the specific structure of the fast-plug cover 2 is designed in aim of being fixed with the docking portion 171 of the seat pipe 17, and so the fast-plug cover 2 is not necessarily structured identically to this embodiment when inserted to other positions, given that the rib 21 is provided.

Moreover, theoretically speaking, the rib 21 may serve as an independent structure that is inserted into the lower frame 10, and may similarly achieve the push function. However, it is more difficult for an independent rib 21 to be fixed in the lower frame 10, and thus the rib 21 is nonetheless preferably attached on the fast-plug cover 2.

Compared to the prior art, in the stroller frame 1 of the present invention, the ribs 141 and 21 that push the first linking rod 12 outward are provided. Thus, when the stroller carries a weight, the first linking rod 12 of the stroller frame 1 is prevented from shifting excessively inward, allowing the reversing sliding sleeve 13 to be smoothly fitted with the fitting portion 121, thereby facilitating locking of the position of the stroller handle 11 and ensuring stability and safety.

The disclosure above provides only preferred embodiments of the present invention to enable a person skilled in the art to understand and carry out implementation accordingly, and is not to be construed as limitations to the scope of claims of the present invention. Therefore, any equivalent modifications made within the scope of the appended claims of the present invention are to be encompassed within the scope of the invention.

What is claimed is:

1. A stroller handle lock auxiliary structure, disposed in a stroller frame of a stroller, the stroller frame comprising a lower frame and a stroller handle pivotally connected on the stroller frame, the lower frame comprising a first linking rod, the first linking rod provided with a fitting portion protruding toward an outer side of the lower frame, the stroller handle provided with a reversing sliding sleeve matching with the fitting portion, the stroller handle lock auxiliary structure comprising a rib that pushes the first linking rod toward an outer side of the lower frame.

2. The stroller handle lock auxiliary structure of claim 1, wherein the first linking rod is further provided with a guide groove, and the rib pushes the first linking rod outward when the rib is fixed with the stroller handle and fitted in the guide groove.

3. The stroller handle lock auxiliary structure of claim 2, wherein a sidewall of an outer side of the guide groove is connected to a guide surface, and the rib is slid into the guide groove through the guide surface when the rib is staggered from an opening of the guide groove.

4. The stroller handle lock auxiliary structure of claim 2, wherein the stroller handle is fixed with a limiting sleeve located below the reversing sliding sleeve, the limiting sleeve comprises a stop block protruding toward an inner side of the stroller frame, and the rib is fixed on the stop block.

5. The stroller handle lock auxiliary structure of claim 2, wherein the first linking rod is provided with a protruding portion protruding outward, one side of the protruding portion forms the fitting portion, and one other side of the protruding portion is provided with the guide groove.

6. The stroller handle lock auxiliary structure of claim 1, wherein the rib is inserted into the lower frame and pushes an inner side of the first linking rod.

7. The stroller handle lock auxiliary structure of claim 6, further comprising a fast-plug cover inserted into the lower frame and located on the inner side of the first linking rod, wherein the rib is protrudingly disposed on one surface of the fast-plug cover facing outward.

8. The stroller handle lock auxiliary structure of claim 7, wherein the rib is shaped as a strip-like structure.

9. The stroller handle lock auxiliary structure of claim 7, wherein the rib has a height of 3 mm.

10. The stroller handle lock auxiliary structure of claim 7, wherein the lower frame comprises a front leg and a seat pipe connected between the front leg and the first linking rod, and the fast-plug cover is inserted between the seat pipe and the first linking rod.

11. The stroller handle lock auxiliary structure of claim 10, wherein the fast-plug cover is fixed on the seat pipe and rotates along with the seat pipe.

12. The stroller handle lock auxiliary structure of claim 11, wherein an end of the seat pipe is provided with a docking portion, and an edge of the fast-plug cover comprises a fixing flange for fitting at the docking portion.

13. The stroller handle lock auxiliary structure of claim 12, wherein an end of the docking portion is provided with a positioning lip, and the fast-plug cover comprises a pushing portion pushing an inner side of the positioning lip.

14. The stroller handle lock auxiliary structure of claim 12, wherein the docking portion is provided with an annular portion, and the fast-plug cover comprises a notch that exposes the annular portion.

15. A stroller handle lock auxiliary structure, disposed in a stroller frame of a stroller, the stroller frame comprising a lower frame and a stroller handle pivotally connected on the stroller frame, the lower frame comprising a first linking rod, the first linking rod provided with a fitting portion protruding toward an outer side of the lower frame, the stroller handle provided with a reversing sliding sleeve matching with the fitting portion, the stroller handle lock auxiliary structure comprising a fast-plug cover inserted into the lower frame and located on an inner side of the first linking rod, wherein one surface of the fast-plug cover facing outward is protrudingly provided with a rib, and the rib pushes the first linking rod toward the outer side of the lower frame.

* * * * *